(12) United States Patent
Spuller (10) Patent No.: US 8,905,741 B2
(45) Date of Patent: Dec. 9, 2014

(54) INJECTION MOLDING NOZZLE

(75) Inventor: Swen Spuller, Forchheim (DE)

(73) Assignee: Otto Männer Innovation GmbH, Bahlingen (DE)

( * ) Notice: Subject to any disclaimer, the term of this patent is extended or adjusted under 35 U.S.C. 154(b) by 55 days.

(21) Appl. No.: 13/136,539

(22) Filed: Aug. 3, 2011

(65) Prior Publication Data

US 2013/0034621 A1 Feb. 7, 2013

(30) Foreign Application Priority Data

Aug. 3, 2010 (DE) .......................... 10 2010 033 153

(51) Int. Cl.
*B29C 45/76* (2006.01)
*B29C 45/27* (2006.01)

(52) U.S. Cl.
CPC ..... *B29C 45/2737* (2013.01); *B29C 2045/2777* (2013.01)
USPC ........................................................ 425/143

(58) Field of Classification Search
CPC ............................... B29C 45/76; B29C 45/78
USPC ........................................................ 425/143
See application file for complete search history.

(56) References Cited

U.S. PATENT DOCUMENTS

| | | | |
|---|---|---|---|
| 4,649,262 A * | 3/1987 | Yoshikawa | 425/144 |
| 5,360,333 A | 11/1994 | Schmidt | |
| 5,411,392 A | 5/1995 | Von Buren | |
| 6,043,466 A | 3/2000 | Jenko et al. | |
| 6,045,742 A * | 4/2000 | McGrevy | 264/328.15 |
| 6,163,016 A | 12/2000 | Johnson et al. | |
| 6,222,165 B1 | 4/2001 | Schwarzkopf | |
| 6,252,210 B1 | 6/2001 | Schwarzkopf | |
| 6,409,497 B1 | 6/2002 | Würstlin | |
| 6,797,925 B1 | 9/2004 | Guenther | |
| 6,805,549 B2 | 10/2004 | Günther | |
| 6,897,418 B1 | 5/2005 | Guenther | |
| 7,049,555 B2 | 5/2006 | Sadowski | |
| 7,118,703 B2 | 10/2006 | Trudeau | |
| 7,137,806 B2 | 11/2006 | Babin et al. | |
| 7,205,511 B2 | 4/2007 | Enrietti | |
| 7,280,750 B2 | 10/2007 | Russegger et al. | |
| 7,377,770 B2 | 5/2008 | Würstlin | |

(Continued)

FOREIGN PATENT DOCUMENTS

DE 7110931 U 11/1971
DE 7225341 U 1/1977

(Continued)

OTHER PUBLICATIONS

GrafTech, "eGraf HS-400", Mar. 2002 accessed at http://europeanthermodynamics.com/Graphite%20Heat%20sinks/HS-400.pdf.*

(Continued)

*Primary Examiner* — Yogendra Gupta
*Assistant Examiner* — Alison Hindenlang
(74) *Attorney, Agent, or Firm* — Dienwiebel Transatlantic IP (57) ABSTRACT

In an injection molding nozzle with an elongated base body through which a channel for conducting a melt extends and which includes a heating element for the introduction of heat into the base body with temperature controlling heating coils disposed at the two ends of the temperature control element, means are provided for reducing the introduction of heat into the base body.

10 Claims, 8 Drawing Sheets

(56) References Cited

U.S. PATENT DOCUMENTS

| | | |
|---|---|---|
| 7,462,031 B2 | 12/2008 | Feick et al. |
| 7,559,760 B2 | 7/2009 | Tabassi |
| 2007/0124907 A1 | 6/2007 | Russegger et al. |
| 2009/0140465 A1* | 6/2009 | Plumpton ............... 264/404 |
| 2011/0186563 A1 | 8/2011 | Schlipf |
| 2012/0189288 A1 | 7/2012 | Vogt et al. |
| 2013/0034621 A1 | 2/2013 | Spuller |

FOREIGN PATENT DOCUMENTS

| | | |
|---|---|---|
| DE | 44 45 744 C1 | 3/1996 |
| DE | 20 108 963 U1 | 8/2001 |
| DE | 20109413 U1 | 8/2001 |
| DE | 20 118 050 U1 | 1/2002 |
| DE | 10 333 206 A1 | 4/2004 |
| DE | 10 358 285 A1 | 7/2004 |
| DE | 103 58 285 | 7/2004 |
| DE | 103 58 285 A * | 7/2004 |
| DE | 10 2004 002 882 | 9/2004 |
| DE | 10313253 A1 | 11/2004 |
| DE | 20 2004 018 132 U1 | 2/2005 |
| DE | 10 2004 009 806 B3 | 4/2005 |
| DE | 20 2009 011 904 U1 | 12/2009 |
| DE | 20 2009 011 904 | 1/2010 |
| DE | 202009011904 u1 | 1/2010 |
| DE | 20 2010 010 581 | 11/2010 |
| DE | 10 2009 039 778 A1 | 3/2011 |
| DE | 10 2010 006 356 A1 | 8/2011 |
| DE | 2495085 A1 | 9/2012 |
| EP | 1 389 517 | 2/2004 |
| EP | 1389517 B1 | 2/2004 |
| EP | 1 395 085 A2 | 3/2004 |
| EP | 1 051 059 | 9/2004 |
| EP | 2 495 085 A1 | 9/2012 |
| JP | 2002 079549 | 3/2002 |
| JP | 2002079549 A * | 3/2002 |
| JP | 2002 331552 | 11/2002 |
| JP | 2002331552 A * | 11/2002 |
| JP | 2003 211493 | 7/2003 |
| JP | 2003211493 A | 7/2003 |
| JP | M356609 U1 | 5/2009 |
| WO | WO 00/46008 | 8/2000 |
| WO | WO 2009/062239 | 5/2009 |

OTHER PUBLICATIONS

"Dura Hot Runner Systems". Mold-Masters Systems. Jun. 1, 2002.

* cited by examiner

INJECTION MOLDING NOZZLE

BACKGROUND OF THE INVENTION

The invention resides in an injection molding nozzle including an elongated base body through which a channel extends for conducting a melt through the nozzle and on which an elongated temperature control element is arranged including a heating element for supplying heat to the base body and which includes heating coils at the two ends of the temperature control element.

Such an injection molding nozzle has been built by the assignee and sold for many years. In the known injection molding nozzle a heating element is disposed on a sleeve which can be slipped onto a generally cylindrical base body. By means of the heating coil, the base body of the injection molding nozzle can be heated so that the melt flowing through the channel remains liquid.

Since the base body of the injection molding nozzle is at its end areas always connected to an injection molding tool, heat is conducted out of the end areas of the injection molding nozzle into the injection molding tool whereby the end areas of the injection molding nozzle are cooled down. This is very disadvantageous since in those end areas the melt can solidify so that it can no longer be worked.

Furthermore, since in the center area of the base body, no heat loss occurs the temperature in this area may become excessively high. This is also disadvantageous since it is very important for the quality of the melt and consequently for the product to be manufactured that the temperature of the melt along the channel is as uniform as possible.

In order to overcome these disadvantages, the injection molding nozzles are provided at their connecting locations with the tool with a heat insulating element as for example a ceramic ring, as it is known for example from DE 10 2004 009 806 B3. Another possibility resides in providing a heating coil which is tighter wound in the end areas of the base body than in its center area. In this way, the end areas of the base body of the injection molding nozzle are heated to a greater degree than the center area.

From DE 20 2009 011 904 U1 for example a heating element is known which includes a sleeve on which a heating coil is disposed. The windings of the heating coil have a very low pitch in the end areas of the sleeve but a very high pitch in the center area of the sleeve. In this way, there are fewer windings in the center area than in the end areas whereby the center area of the sleeve is heated to a lesser degree than the end areas of the sleeve.

Although with the known measures that the heat loss of the two ends of the base body of injection molding nozzle is reduced or, respectively, the two ends are heated to a greater degree than the center area of the base body of the injection molding nozzle, it still can happen that, because of a heat backup, the temperature in the center area of the base body of the injection molding nozzle reaches values at which the melt in the channel can be damaged. The temperature distribution over the length of the channel is therefore still not satisfactory.

It is the object of the present invention to provide an injection molding nozzle of the type described above wherein the temperature distribution of the melt in the channel is improved.

SUMMARY OF THE INVENTION

In an injection molding nozzle with an elongated base body through which a channel for conducting a melt extends and which includes a heating element for the introduction of heat into the base body with temperature controlling heating coils disposed at the two ends of the temperature control element, means are provided for reducing the introduction of heat into the base body.

Since means for reducing the introduction of heat into the base body are provided, the temperature profile of the melt along the channel can be adjusted. By reducing the heat input in the center area of the base body it can be prevented that the temperature exceeds a predetermined value in this area. With a controlled partial reduction of the heat input into the base body, it can actually be achieved that the temperature of the base body is essentially constant over the length of the channel. This is highly advantageous for the quality of the injection-molded product produced with such an injection molding nozzle.

The heat input into the base body can be reduced in a simple manner by a connecting line extending parallel to the axis of the base body and interconnecting the two heating coils. In this way, the length of the heating windings in the center part of the base body is minimal whereby a correspondingly smaller amount of heat energy is conducted into the center area of the base body.

It is very advantageous if the heating element is disposed on a support sleeve and the connecting line is heat-insulated disposed in a first groove. With heat insulation of the connecting line in the first groove, the heat introduced by the connecting line into the center area of the base body is further reduced. The heat insulation can be achieved by means of a material with low heat conductivity or by an arrangement where the connecting line does not come into contact with the wall of the first groove.

A further reduction of the heat input into the base body can be achieved by arranging a second groove parallel to the first groove as it is provided in a particular embodiment of the invention. Advantageously, two additional grooves are provided at both sides of the first groove. In this way, the heat flow which is conducted from the first groove into the wall is interrupted. That means the area of the sleeve in which the first groove is arranged is insulated by the two additional grooves from the rest of the sleeve.

Instead of, or in addition to, the measures described above a reduction of the heat input into the base body can also be achieved by an increase of the cross-section of the support sleeve. With an increase in the cross-section of the carrier sleeve on one hand, the heat introduced into the carrier sleeve is distributed to a greater volume whereby the temperature increase is smaller. On the other hand, the surface of the carrier sleeve is increased, whereby more heat is transferred to the ambient. Furthermore, with an increase in the cross-section, the distance of the carrier sleeve from the wall of an opening formed in the respective injection molding tool in which the injection molding nozzle is generally arranged is decreased whereby heat is conducted to the injection molding tool.

The increase of the cross-section may be continuous but it may be provided also in a stepped manner. Also, several cross-section increases may be provided. Advantageously, the carrier sleeve has the largest diameter at the location where the temperature of the channel would assume the highest value. This should generally be in the center of the carrier sleeve.

The increase in the cross-section can be achieved advantageously in that at least one additional sleeve is slipped onto the carrier sleeve. In this way, the increase in cross-section can be achieved in a simple manner which is also advantageous as far as expenses are concerned.

A further reduction of heat input into the base body can be achieved in that the carrier sleeve or, respectively, the slip-on sleeve is provided with cooling ribs. The cooling ribs increase the surface of the temperature control element whereby more heat is transferred to the ambient. The cooling ribs may have different heights. In this way, the heat transfer to the ambient can be adjusted. In areas where the cooling ribs have a relatively large height the heat transfer to the ambient is relatively large. Where the cooling ribs have a relatively small height the heat transfer to the ambient is correspondingly small.

The cooling ribs may extend in axial direction or in circumferential direction of the carrier sleeve. However, they may also extend spirally similar to a thread with a small pitch. The latter arrangement is advantageous with regard to the manufacture of the cooling ribs.

Instead of cooling ribs, or in addition thereto, the carrier sleeve or respectively, if present, the slip-on sleeve may be provided with radially projecting pins.

Advantageously, the ribs, or, respectively, the pins may have such a height that they are in contact with the wall of the opening in which the injection molding nozzle is generally accommodated. In this way, more heat is transferred to the injection molding tool.

An embodiment of the invention, wherein the support sleeve and/or the slip-on sleeve consists of a material which has a direction-dependent heat transfer coefficient has been found to be very advantageous. If the carrier sleeve or, respectively, the slip-on sleeve has a very high heat transfer coefficient in axial direction the heat of the overheated center area can be conducted to the end areas which have a lower temperature. As material for example HS400 heat sink material or HAT-700 of the company GRAfTec (www.graftec.com) may be used.

The reduction of the heat input into the base body is achievable by means of the above-described measures may be so large that for example in the center area, no heat provided by the part of the heating coil arranged in the center area of the carrier sleeve is conducted into the base body and also heat transferred into the base body from the areas of the heating coil arranged in the end areas of the carrier sleeve which reaches the center area of the base body is conducted away. That means that, in the center area of the base body, there is a negative heat input that is heat is conducted away therefrom.

A heat transfer can in particular also be achieved in that the temperature control element includes an active cooling element. In this way, the temperature of the base body can be effectively lowered in the center area.

The active cooling element may be in the form of a tube through which a cooling medium can be conducted. In this way, heat can be removed from the base body of the injection molding nozzle in a simple manner. As cooling medium for example air, water or carbon dioxide may be used.

If the tube has an enlarged cross-section in the center area of the carrier sleeve as it is provided in a further particular embodiment of the invention, the base body of the injection molding nozzle can be cooled in accordance with a compression and expansion refrigeration system. Herein, gaseous refrigerant is a diabatically compressed by a compressor and supplied to the area of increased cross-section of the tube. By the enlarged cross-section area, an expansion space is formed in which the refrigerant expands whereby it is cooled. After expansion, it is again supplied to the compressor. The active cooling element may also be in the form of a Peltier element. Herewith heat can be removed from the carrier sleeve or, respectively, the base body of the injection molding nozzle in a controlled manner.

The present invention will become more readily apparent from the following description of a particular embodiment thereof with reference to the accompanying drawings.

BRIEF DESCRIPTION OF THE DRAWINGS

It is shown in:

FIG. 1A an injection molding nozzle with a first embodiment of a temperature control element, FIG. 1B the injection molding nozzle of FIG. 1A in a cross-sectional view, FIG. 2 a second embodiment of a temperature control element according to the invention, FIG. 3A a third embodiment of a temperature control element according to the invention, FIG. 3B the temperature control element of FIG. 3A in a cross-sectional view, FIG. 4A a fourth embodiment of a temperature control element according to the invention, FIG. 4B the temperature control element of FIG. 4A in a cross-sectional view, FIG. 5A a fifth embodiment a temperature control element according to the invention, FIG. 5B the temperature control element of FIG. 5A in a cross-sectional view, FIG. 6A a sixth embodiment of a temperature control element according to the invention, FIG. 6B the temperature control element of FIG. 6A in a cross-sectional view, FIG. 7A a seventh embodiment of a temperature control element according to the invention, FIG. 7B the temperature control element of FIG. 7A in a cross-sectional view, FIG. 7C is a top view of the temperature control element shown in FIG. 7A, FIG. 8A an eighth embodiment of a temperature control element according to the invention, and FIG. 8B the temperature control element of FIG. 8A in a cross-sectional view.

DESCRIPTION OF PARTICULAR EMBODIMENTS

Figure 1:
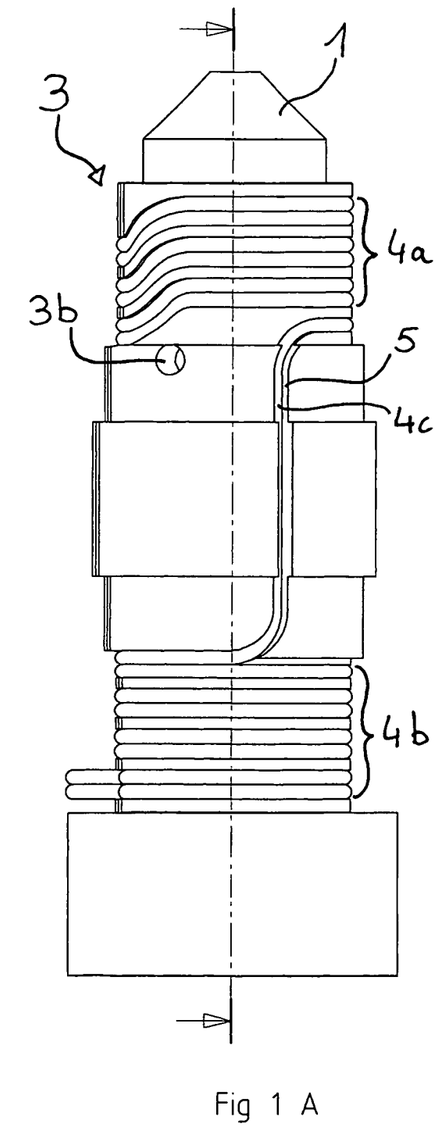

As shown in FIG. 1A and FIG. 1B, an essentially cylindrical base body 1 of an injection molding nozzle includes a channel 2 which extends essentially in axial direction of the injection molding nozzle body 1. Through the channel 2, a melt is conducted to a discharge opening 1a of the base body 1 of the injection molding nozzle.

On the base body 1, a temperature control element 3 is arranged which includes a carrier sleeve 3a on which a heating coil 4a, 4b, 4c is disposed. The carrier sleeve 3a is slipped onto the base body 1 and is in good thermal contact with the base body. The heating coil comprises an upper area 4a and a lower area 4b. The two areas 4a, 4b are interconnected by means of a connecting line 4c. The connecting line extends in an axial direction of the base body 1 of the injection molding nozzle or, respectively, the carrier sleeve 3a. The windings of the upper heating coil area 4a and of the lower heating coil area 4b are arranged in grooves in such a way that they are in good contact with the carrier sleeve 3a. The connecting line 4c is arranged in a groove 5 in such a way that it has only little thermal contact with the carrier sleeve 3a.

When the current flows through the heating coil, the heating coil becomes hot. With the good thermal contact which the heating coil has with the carrier sleeve in the upper area 4a and the lower area 4b, the heating coil transfers heat in these areas to the carrier sleeve 3a and, consequently, also to the base body 1 of the injection molding nozzle. With the little thermal contact between the connecting line 4c and the carrier sleeve 3a only little heat is transferred from the connecting line 4c to the carrier sleeve 3a.

The carrier sleeve 3a has areas of different cross-sections. The area of the largest cross-section 8 is in the center of the carrier sleeve 3a. At opposite ends of the areas with the largest cross-section 8, there are areas 9 provided with the second largest cross-sections. In the two end areas, the carrier sleeve has the smallest cross-section. In the area of the second largest cross-section, an opening 3b is provided for accommodating an installation tool.

With the increase of the cross-section the heat conducted through the connecting line into the carrier sleeve 3.a or the heat reaching the center area from the end areas is distributed to a larger volume whereby, with the same heat amount, a lower temperature increase occurs. Also, with the increase of the cross-section, the surface of the carrier sleeve 3 increases whereby, in the area of increased cross-section 8, 9, the carrier sleeve 3a transfers more heat to the ambient. In addition with the increased cross-section, the distance between the carrier sleeve 3a and the wall of an opening of an injection molding tool in which the injection molding nozzle is generally arranged is decreased whereby heat is transferred to the injection molding tool.

Figure 2:
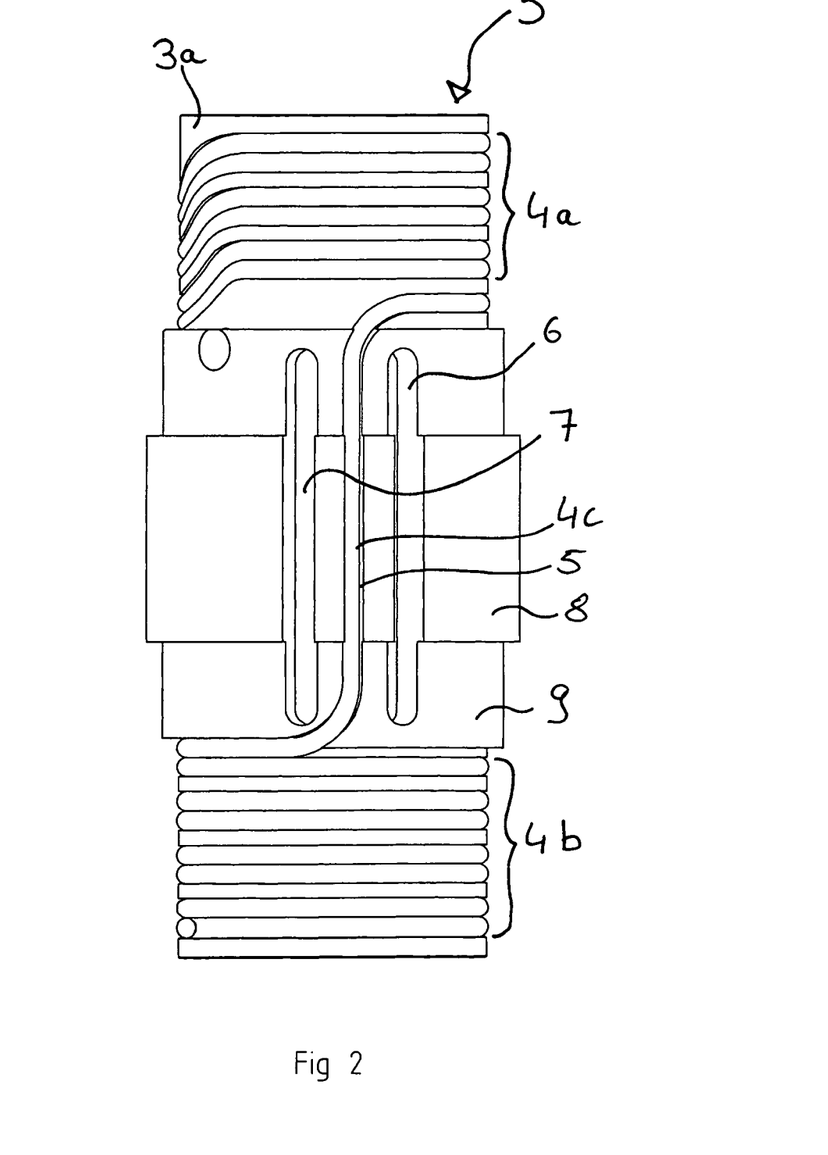

In the embodiment of the temperature control element 3 as shown in FIG. 2 advantageously additional grooves 6, 7 are arranged parallel to the first groove 5. With the two grooves 6, 7, the first groove 5 extends in a relatively narrow web. The heat flow from this web to other areas of the carrier sleeve is interrupted by the grooves 6, 7. As a result, less heat reaches the other area of the carrier sleeve 3a and, consequently, the respective area of the base body 1 of the injection molding nozzle.

Figure 3:
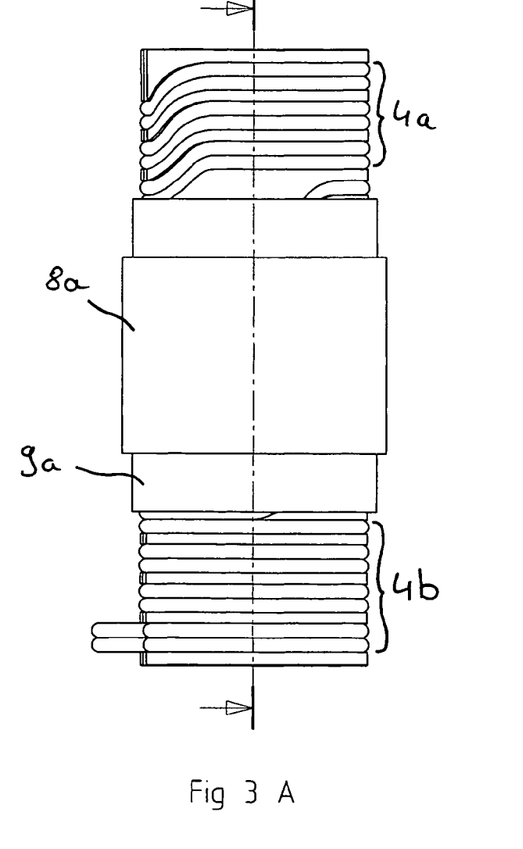

The embodiment of the temperature control element 3 shown in FIG. 3A and FIG. 3B corresponds essentially to the temperature control element shown in FIG. 1A and FIG. 1B. Identical components are designated by the same reference numerals.

Different from the temperature control element shown in FIGS. 1A and 1B, the cross-section increase is achieved in that a slip-on sleeve 9a is slipped onto the carrier sleeve 3a. A second slip-on sleeve 8a is slipped onto the first slip-on sleeve 9a. The slip-on sleeves 9a, 8a are in good contact with each other and with the carrier sleeve 3a.

The advantage of this embodiment is that it can be manufactured particularly easily.

To facilitate installation and removal, the slip-on sleeves may be provided with axial slots. This also provides for a clamping effect by making their inner diameter slightly smaller than the outer diameter of the carrier sleeve.

Figure 4:
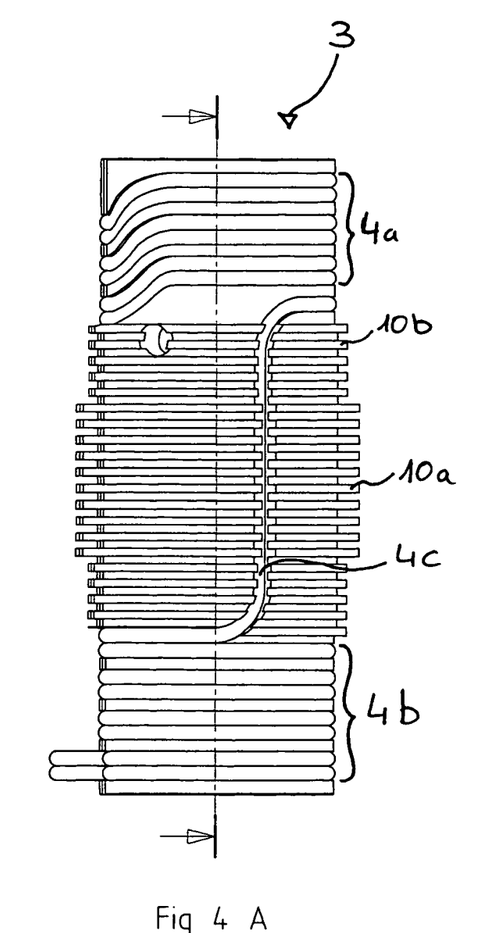

As shown in FIGS. 4A and 4B, the carrier sleeve 3a of the temperature control element 3 may have cooling ribs 10a, 10b. The height of the cooling ribs 10a arranged in the center of the carrier sleeve 3a is greater than the height of the cooling ribs 10b at both sides of the larger cooling ribs 10a. In the end areas of the carrier sleeve 3a no cooling ribs are provided. With this arrangement, the carrier sleeve 3a transfers more heat to the ambient in the center area than in the two adjacent areas or, respectively, in the end areas.

Figure 5:
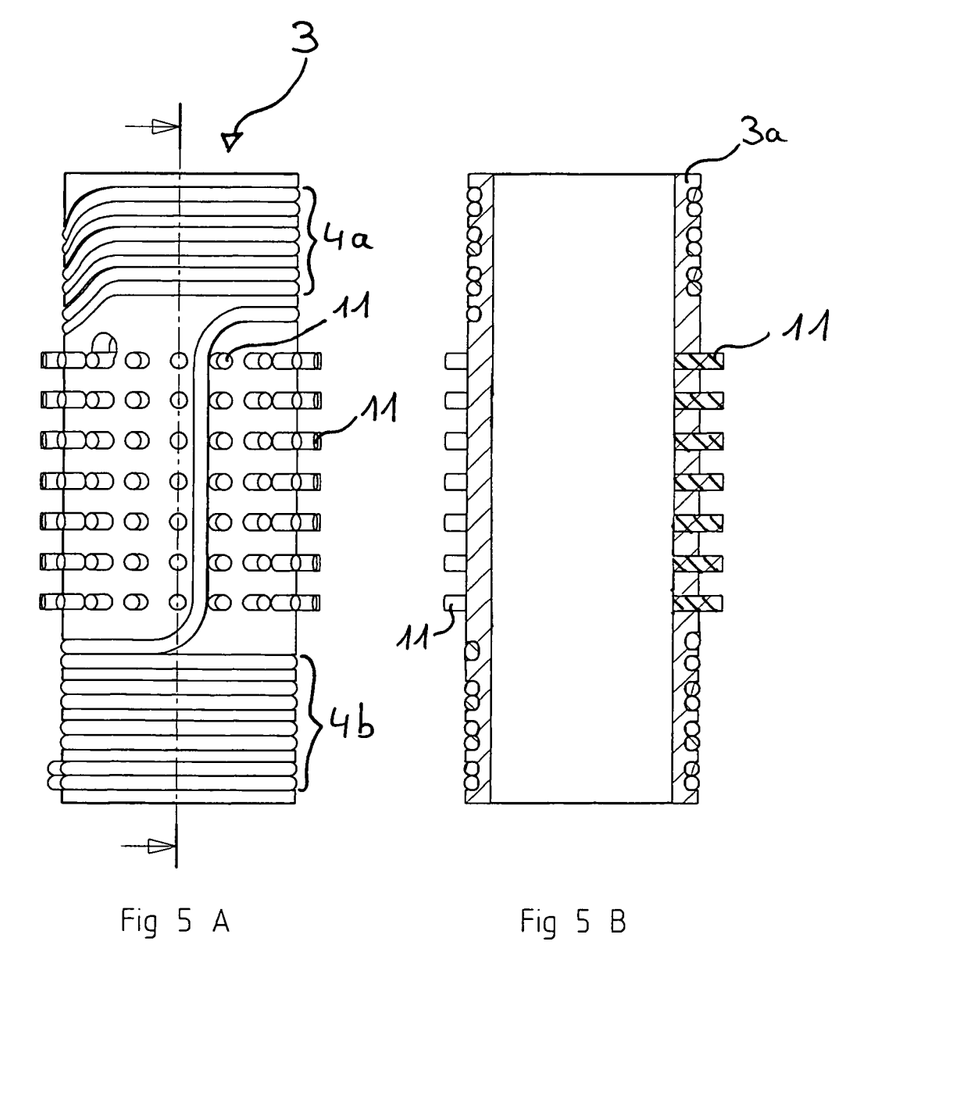

In the embodiments of the temperature control element 3 as shown in FIGS. 5A and 5B, the carrier sleeve is provided with radially extending pins 11 instead of cooling ribs. With the pins, a well-distributed heat transfer to the ambient can be achieved. It permits an accurate adjustment of the temperature distribution in the base body 1 of the injection molding nozzle.

The cooling ribs 10a, 10b as well as the pins 11 may be formed in such a way that they abut the wall of the opening of the injection molding tool in which the injection molding nozzle is generally installed. By the good heat conductive contact obtained hereby, a lot of heat can be transferred to the tool. Furthermore, heat can be removed from certain selected areas of the carrier sleeve 3a or respectively the base body 1 of the injection molding nozzle.

The cooling ribs 10a, 10b as well as the pins 11 and also the carrier sleeve 3a or the slip-on sleeves 8a, 9a may consist of a material which has a direction-dependent heat conduction coefficient. As a result, the material of the cooling ribs 10a, 10b and of the pins 11 should have a very high heat conduction coefficient in a radial direction. The carrier sleeve 3a and the slip-on sleeves 8a, 9a on the other hand should have a very high heat conduction coefficient in axial direction.

Figure 6:
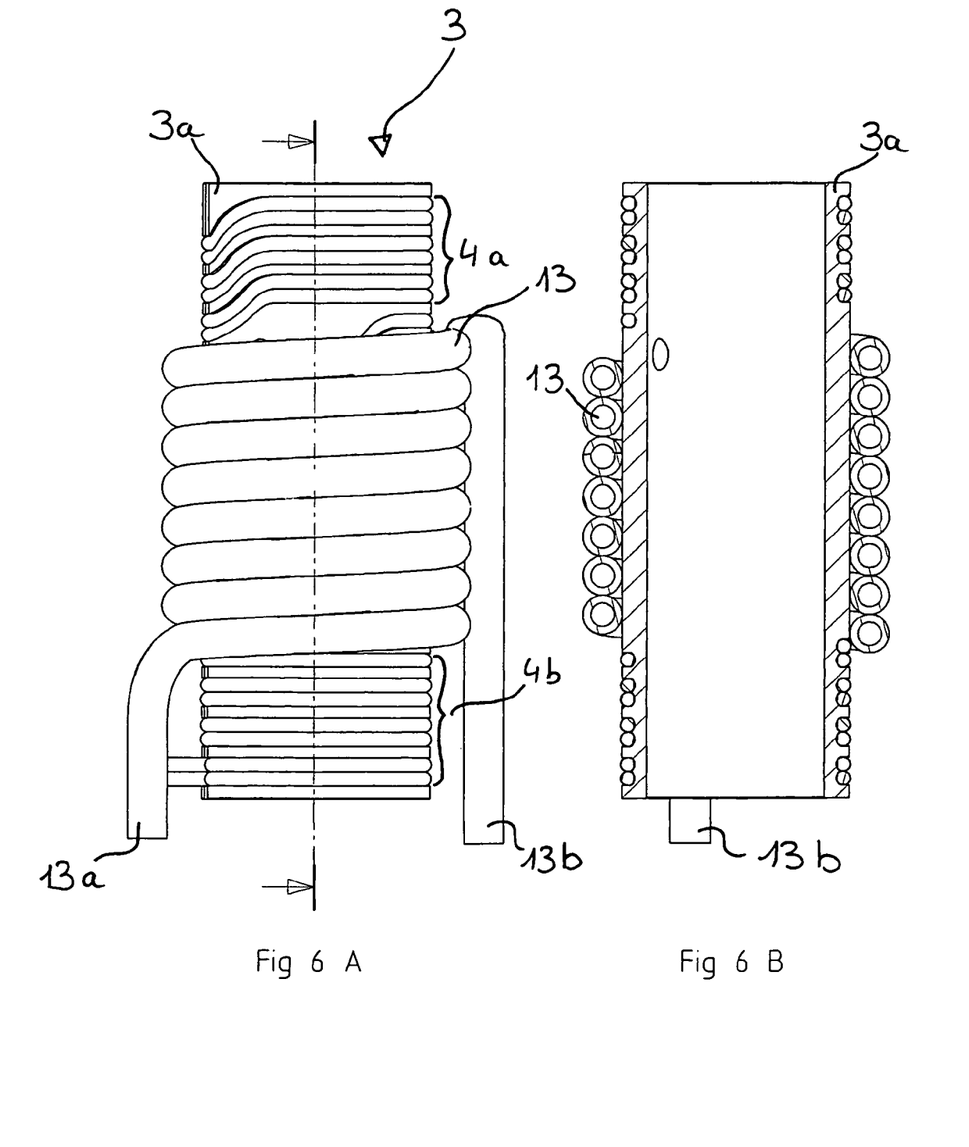

The embodiment of the temperature control element 3 as shown in FIGS. 6A and 6B includes, in its center area, an active cooling element in the form of a tube 13. The tube 13 is wound around the carrier sleeve 3a. At the inlet 13a of the tube 13, a heat carrier is inducted into the tube 13 which leaves the tube at its outlet 13b. The heat carrier may for example be air, water or carbon dioxide. By the temperature of the heat carrier supplied to the tube 13, the heat removal from the center area of the carrier sleeve 13 or, respectively, the base body 1 of the injection mold nozzle can be controlled.

Figure 7:
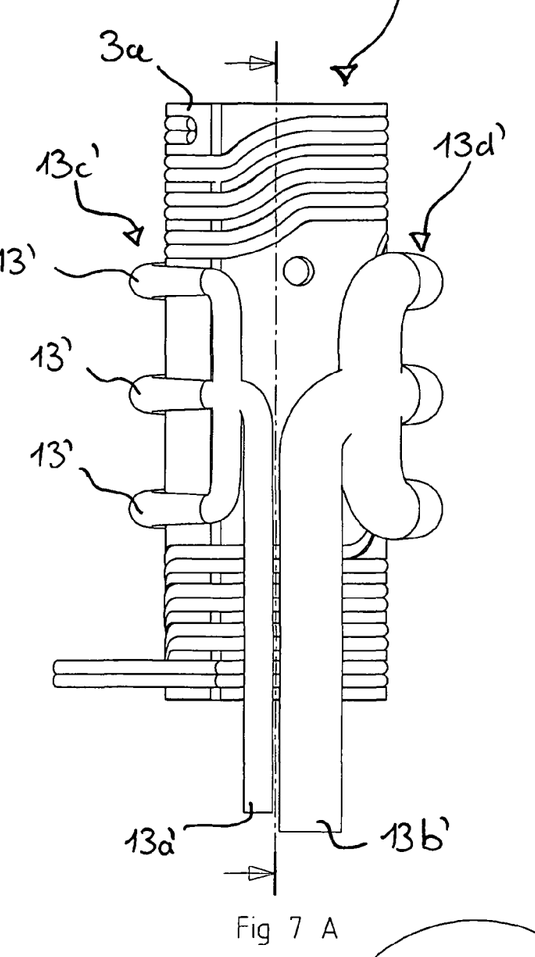

As shown in FIGS. 7A to 7C, the carrier sleeve 3a may be annularly surrounded by tubes 13' which are arranged in parallel. At their ends 13c' connected to the inlet 13a' of the tube, the cross-section of the tubes 13' is smaller than at the outlet 13b' of the ends 13b of the tube 13'. This is particularly apparent from FIG. 7C. With the increased cross-section of the tube 13' the volume of the tube 13' is increased.

The volume increase of the tubes 13' may be used as expansion space for a refrigeration agent, which is generally gaseous. That is, if a liquid refrigerant is supplied to the tubes 13' under high pressure via the inlet 13a' it can expand in the expansion space whereby it becomes again gaseous while its temperature drops. The expanded refrigerant then is conducted via the outlet 136' out of the tube 13' and supplied to a compressor where it is again compressed.

The embodiment of the temperature control element 3 shown in FIGS. 7A to 7C consequently works based on the principle of a compression refrigerator.

Figure 8:
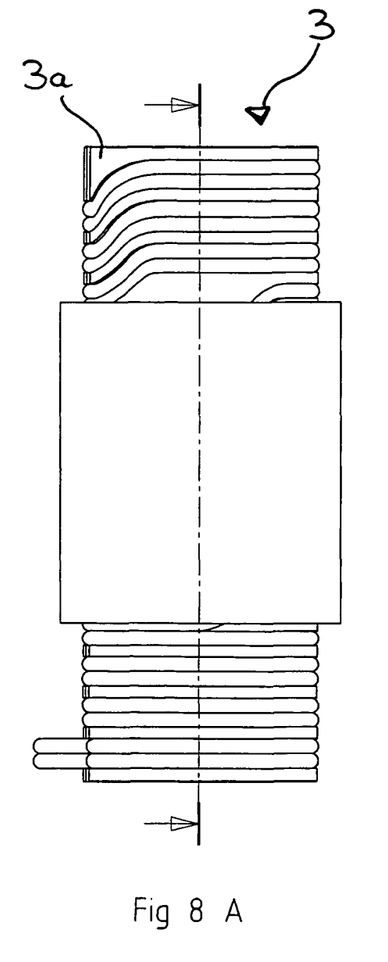

In the embodiments of the temperature control element 3 as shown in FIGS. 8A and 8B, a Peltier element 14 is arranged in the center area of the carrier sleeve 3a instead of the tube winding 13 shown for the embodiments of FIGS. 6A and 6B. With the Peltier element 14 heat can be removed from the carrier sleeve 3a and consequently from the base body in a controlled manner.

What is claimed is:

1. An injection molding nozzle comprising:
an elongated base body with a channel extending there through for receiving a melt
an elongated temperature control element arranged on the elongated base body and including a carrier sleeve and a heating element secured to the carrier sleeve for introducing heat into the base body, the heating element comprising an upper area heating coil and a lower area heating coil arranged in the end areas of the carrier sleeve, wherein each heating coil comprises multiplies windings that are at least partly embedded in one or more external heating grooves, so that at least two adjacent windings along a longitudinal axis of said elongated temperature control element are spaced from each other by at least a sidewall of said one or more heating grooves, where the upper area heating coil and the lower area heating coil are spaced apart and are interconnected by a heater connecting line arranged in a groove extending along the base body, whereby the length of the heating windings in the center part of the base body defined by the heater connecting line is minimal to further reduce an amount of heat energy conducted into the center area of the base body, and where the carrier sleeve further comprises a first longitudinal slot along one side of the heater connecting line and a second longitudinal slot along the other side of the heater connecting line for further reducing the heat input in the center area of the base body relative to the heat input at the upper and lower end portions of the temperature control element.

2. The injection molding nozzle according to claim 1, wherein said heater connecting line extends parallel to a longitudinal axis of said elongated temperature control element.

3. The injection molding nozzle according to claim 1, wherein the first longitudinal slot is arranged in parallel to said heater connecting line.

4. The injection molding nozzle according to claim 1, wherein the second longitudinal slot is arranged in parallel to said heater connecting line.

5. The injection molding nozzle according to claim 1, wherein the first longitudinal slot and the second longitudinal slot extend along the same distance.

6. The injection molding nozzle according to claim 1, wherein the heater connecting line is heat insulated and is arranged in the groove.

7. The injection molding nozzle according to claim 1, wherein the elongated temperature control element is configured with a cross-section increase in the area between the upper and the lower area heating coils to further reduce an amount of heat energy conducted into the center area of the base body.

8. The injection molding nozzle according to claim 7, wherein said cross-section increase is provided by at least one slip-on sleeve.

9. The injection molding nozzle according to claim 8, wherein said slip-on sleeve is further provided with axial slots.

10. The injection molding nozzle according to claim 1, wherein said temperature control element consists at least partially of a material which has a direction-dependent heat conduction coefficient.

* * * * *